United States Patent
Uchida et al.

(10) Patent No.: US 8,001,344 B2
(45) Date of Patent: Aug. 16, 2011

(54) STORAGE CONTROL APPARATUS, STORAGE CONTROL PROGRAM, AND STORAGE CONTROL METHOD

(75) Inventors: Koji Uchida, Kawasaki (JP); Hideaki Omura, Kawasaki (JP); Yasuhito Arikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 215 days.

(21) Appl. No.: 11/589,181

(22) Filed: Oct. 30, 2006

(65) Prior Publication Data

US 2007/0294495 A1    Dec. 20, 2007

(30) Foreign Application Priority Data

Jun. 16, 2006  (JP) .................. 2006-166859

(51) Int. Cl.
*G06F 12/16* (2006.01)
(52) U.S. Cl. ............... 711/162; 711/154; 711/E12.103; 707/639; 707/646; 714/E11.118
(58) Field of Classification Search .......... 711/161–162, 711/154, E12.103; 707/204, 639, 646; 714/6, 714/E11.118
See application file for complete search history.

(56) References Cited

U.S. PATENT DOCUMENTS

| | | | |
|---|---|---|---|
| 5,522,037 A | 5/1996 | Kitagawa et al. | |
| 5,720,026 A | 2/1998 | Uemura et al. | |
| 6,324,654 B1* | 11/2001 | Wahl et al. | 711/162 |
| 7,185,227 B2 | 2/2007 | Eguchi et al. | |
| 7,197,615 B2 | 3/2007 | Arakawa et al. | |
| 7,305,584 B2 | 12/2007 | Eguchi et al. | |
| 7,356,658 B2 | 4/2008 | Satoyama et al. | |
| 7,549,083 B2 | 6/2009 | Eguchi et al. | |
| 7,606,990 B2 | 10/2009 | Satoyama et al. | |
| 7,620,785 B1* | 11/2009 | Coulter et al. | 711/161 |
| 2003/0005235 A1* | 1/2003 | Young | 711/141 |
| 2003/0167380 A1* | 9/2003 | Green et al. | 711/136 |
| 2004/0123031 A1* | 6/2004 | Kiselev et al. | 711/114 |
| 2005/0135176 A1* | 6/2005 | Ramakrishnan et al. | 365/230.01 |

(Continued)

FOREIGN PATENT DOCUMENTS

JP    7-84728    3/1995

(Continued)

OTHER PUBLICATIONS

NA910924, "Backward Restore From Incremental Backup," Sep. 1991, IBM Technical Disclosure Bulletin, vol. 34, Iss. 4A, pp. 24-26.*

(Continued)

*Primary Examiner* — Michael Krofcheck
(74) *Attorney, Agent, or Firm* — Fujitsu Patent Center

(57) ABSTRACT

Disclosed are a storage control apparatus, a storage control program, and a storage control method that collect the backup of storage data in units of generation at low cost.
A storage control apparatus that creates a generation backup of a storage, comprising: a first copy section that creates a snapshot of at least one of all data stored in the storage at an indicated time point and difference data stored in the storage in an indicated time period; a second copy section that creates a mirror of at least one of all data stored in the storage and difference data stored in the storage in an indicated time period; and a controller that causes one of the first and second copy sections to copy all data stored in the storage and causes the other to copy difference data between generations stored in the storage.

6 Claims, 17 Drawing Sheets

U.S. PATENT DOCUMENTS

| | | |
|---|---|---|
| 2005/0223170 A1 | 10/2005 | Ushijima et al. |
| 2005/0228945 A1* | 10/2005 | Nagata ............................ 711/114 |
| 2006/0036901 A1* | 2/2006 | Yang et al. ........................ 714/6 |
| 2006/0095405 A1* | 5/2006 | Anderson et al. ................. 707/3 |
| 2007/0118705 A1 | 5/2007 | Arakawa et al. |
| 2007/0245105 A1* | 10/2007 | Suzuki et al. ................. 711/162 |
| 2009/0089614 A1 | 4/2009 | Eguchi et al. |
| 2010/0030959 A1 | 2/2010 | Satoyama et al. |

FOREIGN PATENT DOCUMENTS

| | | |
|---|---|---|
| JP | 7-084728 | 3/1995 |
| JP | 09-101912 A | 4/1997 |
| JP | 2002-278819 | 9/2002 |
| JP | 2002-318717 | 10/2002 |
| JP | 2004-252686 A | 9/2004 |
| JP | 2005-122611 | 5/2005 |
| JP | 2005-292865 | 10/2005 |
| JP | 2006-023889 A | 1/2006 |
| JP | 2006-107162 A | 4/2006 |

OTHER PUBLICATIONS

Japanese Notification of Reasons for Refusal, English-language translation, mailed Dec. 14, 2010 for corresponding Japanese Application No. 2008-265038.

* cited by examiner

FIG. 2

| COPY SESSION MANAGEMENT INFORMATION |
|---|
| SESSION IDENTIFIER |
| SESSION TYPE |
| SESSION STATUS |
| COPY SOURCE LUN |
| COPY DESTINATION LUN |
| COPY SOURCE-COPY TARGET START LBA |
| COPY DESTINATION-COPY TARGET START LBA |
| NUMBER OF COPY TARGET LBA |
| COPY STATE MANAGEMENT BITMAP |

FIG. 3

| LOGICAL LBA | PHYSICAL LBA |
|---|---|
| 0 | UNSTORED |
| 1 | 2 |
| 2 | 0 |
| 3 | 1 |
| : | : |
| N | M |

FIG. 4

| GENERATION | COLLECTION TIME | SESSION IDENTIFIER |
|---|---|---|
| 1 | 9:00 | OPC |
| 2 | 10:00 | DIFFERENCE EC A |
| 3 | 11:00 | DIFFERENCE EC B |
| 4 | 12:00 | DIFFERENCE EC C |
| : | : | : |
| N | HH:MM | S |

| BACKUP DATA ON OPC DISK TO TAPE ACCORDING TO NORMAL READ COMMAND FROM HOST | ～S411 |
| BACKUP DATA ON DIFFERENCE EC DISKS TO TAPE ACCORDING TO SPECIAL COMMANDS | ～S412 |
| BACKUP LBA CONVERSION TABLE TO TAPE ACCORDING TO SPECIAL COMMANDS | ～S413 |

| GENERATION | SET TIME | SESSION IDENTIFIER |
|---|---|---|
| - | | EC |
| 1 | 9:00 | DIFFERENCE OPC A |
| 2 | 10:00 | DIFFERENCE OPC B |
| 3 | 11:00 | DIFFERENCE OPC C |
| : | : | : |
| N | HH:MM | S |

STORAGE CONTROL APPARATUS, STORAGE CONTROL PROGRAM, AND STORAGE CONTROL METHOD

BACKGROUND OF THE INVENTION

1. Field of the Invention

The present invention relates to a storage control apparatus, a storage control program, and a storage control method that collect the backup of storage data in units of generation.

2. Description of the Related Art

Generally, a computer system collects the backup of storage data for data restoration from a system failure or operation error. As an enhanced copy function for use in making a backup, OPC (One Point Copy) and EC (Equivalent Copy) are known. A main function of the OPC is to create a snapshot, by which data in a copy destination storage serves as data in a copy source storage in the time point when a copy instruction is issued. A main function of EC is to create a mirror, by which data in a copy destination storage synchronizes with data in a copy source storage during a specified time period.

As a conventional art related to the present invention, there is known a generation management system concerning a snapshot image, which includes a data holding section that stores a snapshot image at a given time point and another data holding section that stores subsequent updated data, updated areas, and generations (refer to Pat. Document 1: Jpn. Pat. Appln. Laid-Open Publication No. 2005-292865).

In view of data restoration from backup data, it is desirable to collect backup over a plurality of generations at fine time intervals. However, in the conventional art, it has been necessary to prepare volumes each having the same capacity as a backup source storage by the number corresponding to backup generations. Further, in a technique like Pat. Document 1, it is necessary to newly add a mirroring function for simultaneously writing data both for current generation and backup and a path configuration for use in the mirroring operation in advance. Further, with a lapse of time from the initial copy processing, the number of updated data is increased to increase a load involved with a data restoration process.

SUMMARY OF THE INVENTION

The present invention has been made to solve the above problems and an object thereof is to provide a storage control apparatus, a storage control program, a storage control method capable of collecting the backup of storage data in units of generation at low cost.

To solve the above problem, according to a first aspect of the present invention, there is provided a storage control apparatus that creates a generation backup of a storage, comprising: a first copy section that creates a snapshot of at least one of all data stored in the storage at an indicated time point and difference data stored in the storage in an indicated time period; a second copy section that creates a mirror of at least one of all data stored in the storage and difference data stored in the storage in an indicated time period; and a controller that causes one of the first and second copy sections to copy all data stored in the storage and causes the other to copy difference data between generations stored in the storage.

In the storage control apparatus according to the present invention, the controller causes the first copy section to create a snapshot of all data of a first generation stored in the storage and causes the second copy section to create a mirror of difference data between generations stored in the storage.

In the storage control apparatus according to the present invention, the controller causes the second copy section to create a mirror of all data stored in the storage and causes the first copy section to create a snapshot of difference data between generations stored in the storage.

In the storage control apparatus according to the present invention, the controller causes the first copy section to create a snapshot of all data of a first generation stored in the storage as well as causes the second copy section to create a mirror of all data stored in the storage and causes the second copy section to create a mirror of difference data between generations stored in the storage as well as causes the first copy section to create a snapshot of difference data between generations stored in the storage.

In the storage control apparatus according to the present invention, upon receiving an instruction of restoration including a restoration target time after the snapshot of all data has been created by the first copy section and one or more mirrors of difference data have been created by the second copy section, the controller reflects the mirror of difference data prior to the restoration target time on the snapshot of all data in chronological order from oldest to newest and reflects the obtained snapshot of all data on the storage.

In the storage control apparatus according to the present invention, upon receiving an instruction of restoration including a restoration target time after the mirror of all data has been created by the second copy section and one or more snapshots of difference data have been created by the first copy section, the controller reflects the snapshot of difference data after the restoration target time on the storage in chronological order from newest to oldest.

In the storage control apparatus according to the present invention, upon receiving an instruction of restoration including a restoration target time after the snapshot of all data has been created by the first copy section as well as mirror of all data has been created by the second copy section and one or more mirrors of difference data have been created by the second copy section as well as one or more snapshots of difference data have been created by the first copy section, the controller determines which one of the time of the first generation and current time is closer to the restoration target time and, if the time of the first generation is closer to the restoration target time, reflects the mirror of difference data prior to the restoration target time on the snapshot of all data in chronological order from oldest to newest and reflects the obtained snapshot of all data on the storage while, if the current time is closer to the restoration target time, reflects the snapshot of difference data stored after the restoration target time on the storage in chronological order from newest to oldest.

In the storage control apparatus according to the present invention, when receiving a read or write operation instruction for the storage from outside under the condition where there is any data that has not been reflected from the mirror of difference data prior to the restoration target time on the storage in a target area of the read or write operation, the controller reflects the newest data in the mirror on the storage and then executes the read or write operation.

In the storage control apparatus according to the present invention, when receiving a read or write operation instruction for the storage from outside under the condition where there is any data that has not been reflected from the snapshot of difference data stored after the restoration target time on the storage in a target area of the read or write operation, the controller reflects the oldest data in the snapshot on the storage and then executes the read or write operation.

In the storage control apparatus according to the present invention, when receiving a write operation instruction for the storage from outside under the condition where a copy operation from a target area of the write operation to the snapshot of all data has not been completed, the controller copies the data before the write operation to the snapshot of all data and then executes the write operation.

In the storage control apparatus according to the present invention, when receiving a write operation instruction for the storage from outside under the condition where a copy operation from a target area of the write operation to the snapshot of deference data has not been completed, the controller copies the data before the write operation to the snapshot of difference data and then executes the write operation.

According to a second aspect of the present invention, there is provided a storage control program allowing a computer to create a generation backup of a storage, the program allowing the computer to execute: a first copy step that creates at least one of a snapshot of all data stored in the storage and a mirror of all data stored in the storage at an indicated time point; and a second copy step that creates at least one of a snapshot of difference data between generations stored in the storage and a mirror of difference data between generations stored in the storage after the start of the first copy step.

In the storage control program according to the present invention, the first copy step creates a snapshot of all data of a first generation stored in the storage, and the second copy step creates a mirror of difference data between generations stored in the storage.

In the storage control program according to the present invention, the first copy step creates a mirror of all data stored in the storage, and the second copy step creates a snapshot of difference data between generations stored in the storage.

In the storage control program according to the present invention, the first copy step creates a snapshot of all data of a first generation stored in the storage as well as creates a mirror of all data stored in the storage, and the second copy step creates a mirror of difference data between generations stored in the storage as well as creates a snapshot of difference data between generations stored in the storage.

In the storage control program according to the present invention, upon receiving an instruction of restoration including a restoration target time after the snapshot of all data has been created by the first copy step and one or more mirrors of difference data have been created by the second copy step, the program allows the computer to execute a restoration step that reflects the mirror of difference data prior to the restoration target time on the snapshot of all data in chronological order from oldest to newest and reflects the obtained snapshot of all data on the storage.

In the storage control program according to the present invention, upon receiving an instruction of restoration including a restoration target time after the mirror of all data has been created by the first copy step and one or more snapshots of difference data have been created by the second copy step, the program allows the computer to execute a restoration step that reflects the snapshot of difference data after the restoration target time on the storage in chronological order from newest to oldest.

In the storage control program according to the present invention, upon receiving an instruction of restoration including a restoration target time after the snapshot of all data as well as mirror of all data have been created by the first copy step and one or more mirrors of difference data as well as one or more snapshots of different data have been created by the second copy step, the program allows the computer to execute a restoration step that determines which one of the time of the first generation and current time is closer to the restoration target time and, if the time of the first generation is closer to the restoration target time, reflects the mirror of difference data prior to the restoration target time on the snapshot of all data in chronological order from oldest to newest and reflects the obtained snapshot of all data on the storage while, if the current time is closer to the restoration target time, reflects the snapshot of difference data stored after the restoration target time on the storage in chronological order from newest to oldest.

According to a third aspect of the present invention, there is provided a storage control method that creates a generation backup of a storage, comprising: a first copy step that creates at least one of a snapshot of all data stored in the storage and a mirror of all data stored in the storage at an indicated time point; and a second copy step that creates at least one of a snapshot of difference data between generations stored in the storage and a mirror of difference data between generations stored in the storage after the start of the first copy step.

According to the present invention, it is possible to collect the backup of storage data in units of generations at low cost.

BRIEF DESCRIPTION OF THE DRAWINGS

FIG. 2 is a table showing a configuration example of copy session management information according to the first embodiment;

FIG. 3 is a table showing a configuration of an LBA conversion table according to the first embodiment;

FIG. 4 is a table showing a configuration example of a generation management table according to the first embodiment;

DETAILED DESCRIPTION OF THE PREFERRED EMBODIMENTS

Embodiments of the present invention will be described below with reference to the accompanying drawings.

First Embodiment

In the first embodiment, a storage control apparatus that uses OPC (processing performed by a first copy section) and difference EC (processing performed by a second copy section) to perform generation backup processing and generation restoration processing will be described. OPC is used to collect the first generation backup of the entire user disk. For the subsequent generations, difference EC uses an EC function to copy only a difference between a current generation and a previous generation.

A configuration of a storage apparatus that uses a storage control apparatus according to the present embodiment will be described.

Figure 1:
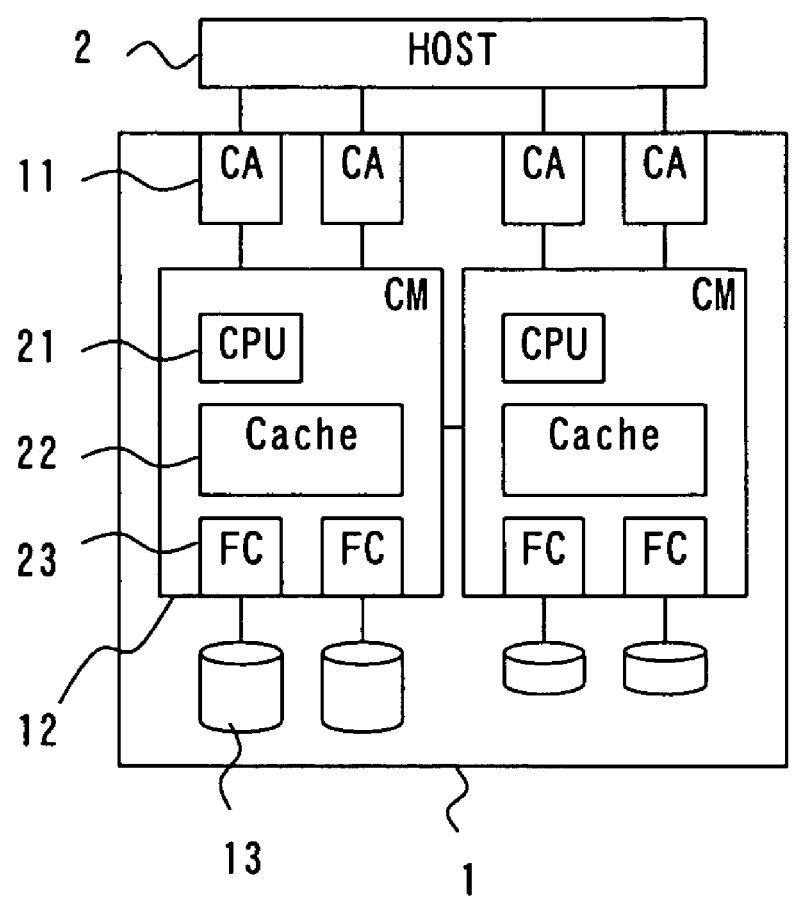
FIG. 1 is a block diagram showing a configuration example of a storage apparatus according to the first embodiment.

FIG. 1 is a block diagram showing a configuration example of a storage apparatus according to the first embodiment. The storage apparatus 1 is connected to a host 2. The storage apparatus 1 includes a CA (Channel Adaptor) 11, a CM (Centralized Module) 12 (storage control apparatus), and a disk 13. The CM 12 includes a CPU (Central Processing Unit) 21 (first copy section, second copy section, controller), a cache memory (Cache) 22, and an FC (Fibre Channel) controller 23.

The host 2 receives an operation input from an operator and makes an access to the storage apparatus 1. The CA 11 controls the interface with the host 2. The FC controller 23 controls the interface with the disk 13. The cache memory 22 stores user data or control data. The CPU 21 performs resource management or copy control for the cache memory 22, FC controller 23, and CA 11.

The disk 13 according to the present embodiment includes a user disk serving as a copy source, an OPC disk serving as a copy destination of the data that is copied from the entire user disk by OPC function and difference EC disks A, B, and C each serving as a copy destination of a difference copy obtained by EC function.

Control data according to the present embodiment will next be described.

The cache memory 22 stores, as control data, copy session management information, an LBA (Logical Block Address) conversion table, and a generation management table.

The copy session management information will firstly be described. FIG. 2 is a table showing a configuration example of the copy session management information according to the present embodiment. A unit of copy processing such as a single OPC operation or a single difference EC operation is called "session". For example, the single OPC operation is called "OPC session" and single difference EC operation for a difference EC disk A is called "difference EC session A". The copy session management information includes session identifier, session type, session status, copy target area (copy source LUN (Logical Unit Number)), copy destination LUN, copy source-copy target start LBA, copy destination-copy target start LBA, number of copy target LBAs, and BitMap indicating an uncopied area. The session identifier is a unique number indicating a session. The session type has values including OPC, EC, difference OPC, difference EC, and the like. The session status represents a state of a session and has values including Active, Suspend, and the like.

The LBA conversion table will next be described. FIG. 3 is a table showing a configuration of the LBA conversion table according to the first embodiment. The LBA conversion table holds information indicating the storage position of data on the difference EC disk. In the LBA conversion table, logical LBA indicating the LBA of the data on the user disk and physical LBA indicating the actual LBA of the data on the difference EC disk are related to each other.

The generation management table will next be described. FIG. 4 is a table showing a configuration example of the generation management table according to the first embodiment. The generation management table manages a generation between sessions and includes generation number, collection time (session set time), and session identifier. Only the first generation holds an identifier of the OPC session and subsequent generations hold identifiers of the difference EC session.

Generation backup processing according to the present embodiment will next be described.

The generation backup processing includes generation backup start processing, generation switch processing, Write I/O processing during generation backup, and difference EC management processing. Incidentally, the OPC session creates a snapshot of all data of the user disk on the OPC disk at the start time of the OPC session. The difference EC session creates a mirror of difference data on the user disk obtained from the start time to suspend of the difference EC session to a corresponding difference EC disk.

Figure 5:
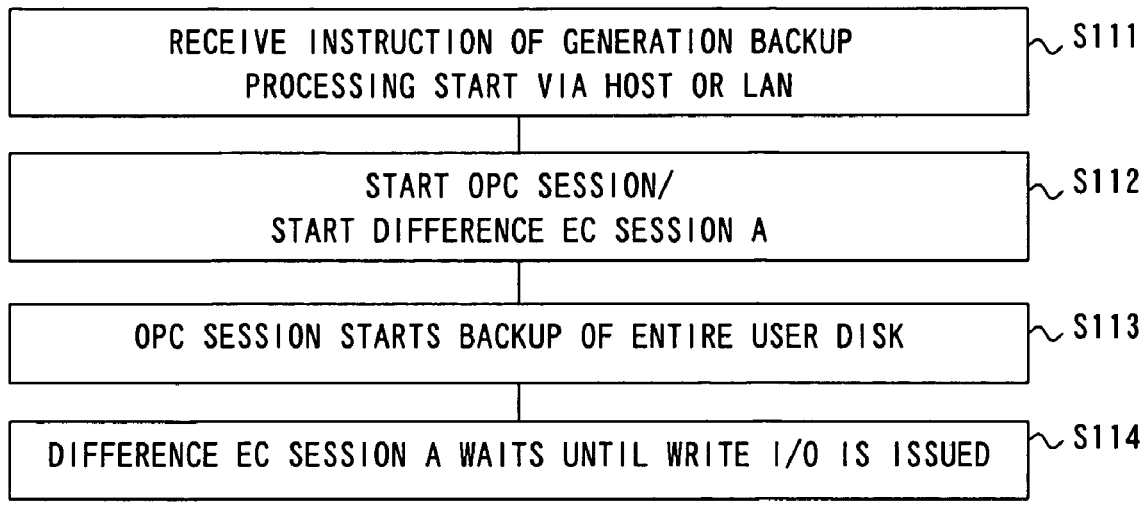
FIG. 5 is a flowchart showing an operation example of generation backup start processing according to the first embodiment.

The generation backup start processing will be described. FIG. 5 is a flowchart showing an operation example of the generation backup start processing according to the first embodiment. Upon receiving an instruction of the generation backup processing via the host 2 or LAN (S111), the CPU 21 makes settings for starting the OPC session and difference EC session A (S112). The OPC session activated by the CPU 21 starts the backup of the entire user disk (initial copy processing) (S113). The difference EC session A activated by the CPU 21 waits until Write I/O is issued (S114) and this flow is ended.

Figure 6:
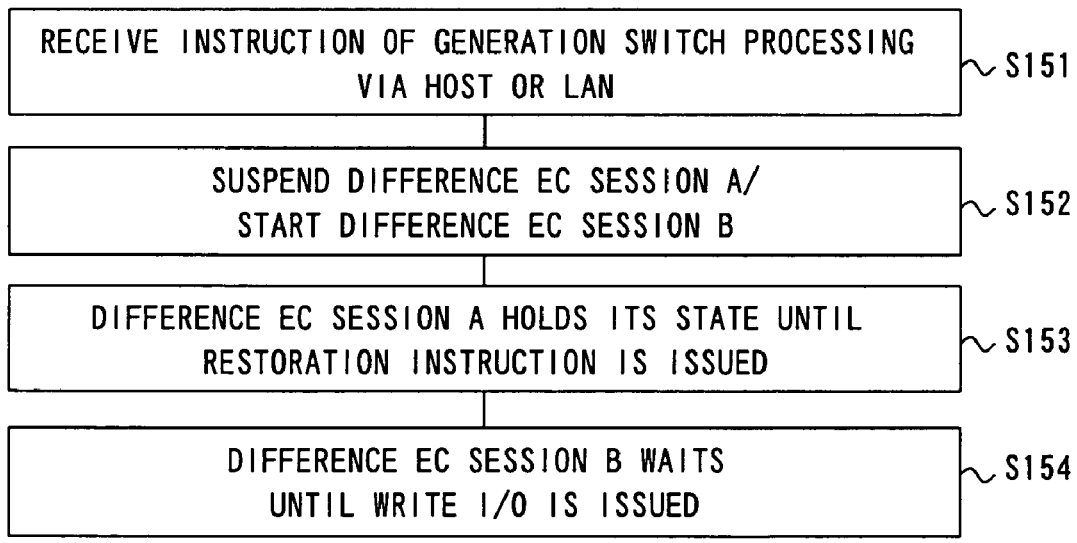
FIG. 6 is a flowchart showing an operation example of generation switch processing according to the first embodiment.

The generation switch processing will next be described. It is assumed in this description that the difference EC session A which is in operation is switched to the difference EC session B. FIG. 6 is a flowchart showing an operation example of the generation switch processing according to the first embodiment. Upon receiving an instruction of the generation switch processing via the host 2 or LAN (S151), the CPU 21 makes setting for suspending the difference EC session A and starting the difference EC session B (S152). The difference EC session A activated by the CPU 21 holds its state until a restoration instruction for recovery is issued (S153), while the difference EC session B activated by the CPU 21 waits until Write I/O is issued (S154) and this flow is ended.

Figure 7:
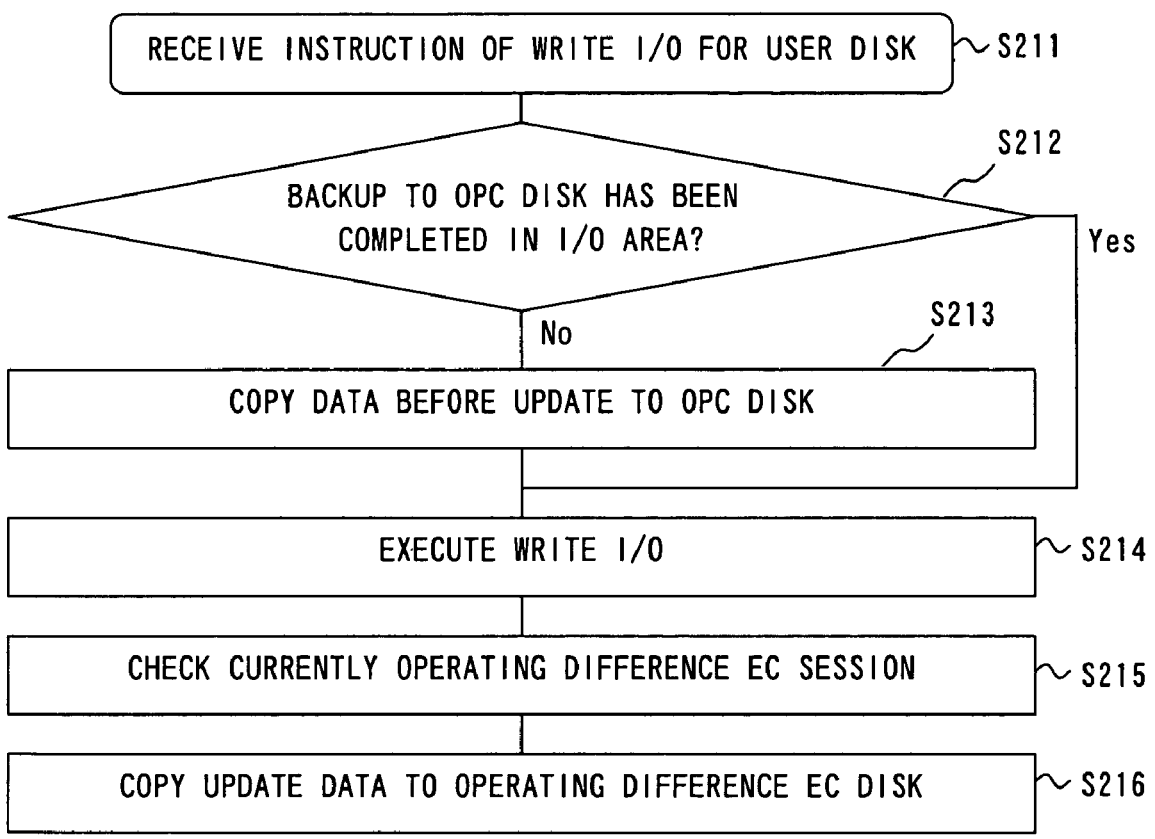
FIG. 7 is a flowchart showing an operation example of Write I/O processing during generation backup according to the first embodiment.

The Write I/O processing during generation backup will next be described. FIG. 7 is a flowchart showing an operation example of the Write I/O processing during generation backup according to the first embodiment. Upon receiving an instruction of Write I/O for the user disk via the host 2 or LAN (S211), the CPU 21 determines whether the backup to the OPC disk has been completed in the I/O area (S212). When determining that the backup to the OPC disk has been completed in the I/O area (Yes in S212), the CPU 21 proceeds to step S214. If not completed (No in S212), the CPU 21 copies data before update to the OPC disk (S213). The CPU 21 then executes Write I/O (S214). After that, the CPU 21 checks the currently operating difference EC session (S215) and copies update data to the checked operating difference EC disk (S216), and this flow is ended.

The difference EC management processing will next be described.

The difference EC management processing is processing for managing the difference EC session. The CPU 21 stores, as an LBA conversion table, a correspondence between position information (logical LBA) of the data on the user disk and physical position information (physical LBA) of the data on the difference EC disk and uses this table for control. In the case where data on the user disk (copy source) is updated during the difference EC session, the CPU 21 stores the update data to fill up the free space of the difference EC disk (copy destination) from the front first.

Operation performed in the case where Read I/O or Write I/O is issued from the host 2 during the difference EC session will be described.

When Write I/O is issued to a copy source, the CPU 21 stores update data in a copy destination. At this time, the CPU 21 stores the update data in the free space on a physical disk serving as a copy destination.

When Write I/O is issued to a copy destination, the CPU 21 checks whether the relevant data has already existed on a physical disk serving as a copy destination. If existed, the CPU 21 reflects the update data to the checked area. If not exist, the CPU 21 stores the update data in the free space on the copy destination physical disk.

In the case where "data a" is requested at the time when Read I/O is issued to a copy destination, the CPU 21 searches a copy destination physical disk of generation n for "data b" corresponding to "data a". If "data b" exists, the CPU 21 transfers "data b" existing on the physical disk. If "data b" does not exist, the CPU 21 searches a physical disk of generation (n−m) (m=1, 2, 3, . . .) for data corresponding to "data a". If "data b" corresponding to "data a" exists, the CPU 21 transfers "data b". If "data b" corresponding to "data a" has not been found even after searching physical disks of all generations, the CPU 21 transfers data on the OPC disk.

A concrete example of the abovementioned generation backup processing will next be described.

Figure 8:
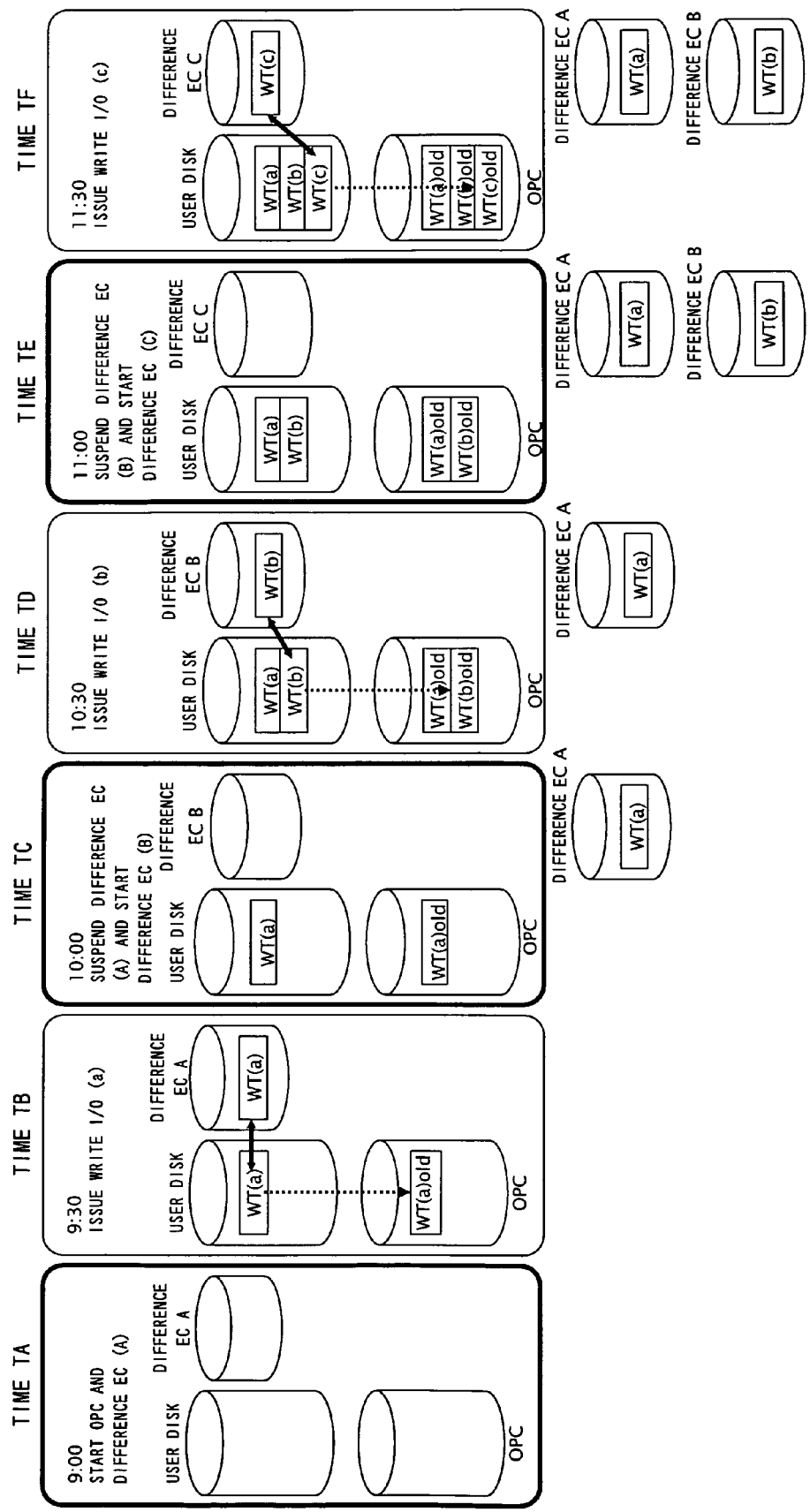
FIG. 8 is a view showing a concrete operation example of generation backup processing according to the first embodiment.

FIG. 8 is a view showing a concrete operation example of the generation backup processing according to the first embodiment. It is assumed that the storage control apparatus 1 has received an instruction of the generation backup processing at time TA from the host 2. At this time, the CPU 21 executes the generation backup start processing to start the OPC session and difference EC session A. The OPC session starts the backup of data from the user disk to OPC disk. The difference EC session A waits until Write I/O is issued.

It is assumed that the storage control apparatus 1 has received Write I/O (WT(a)) from the host 2 at time TB. If the backup to the OPC disk from the user disk has not been completed in the I/O area at this time, the CPU 21 copies data before update (WT (a) old) to the OPC disk. The difference EC session A copies update data (WT (a)) on the user disk to the difference EC disk A.

It is assumed that the storage control apparatus 1 has received an instruction of the generation switch processing from the host 2 at time TC. At this time, the CPU 21 suspends the difference EC session A and starts a difference EC session B for storing difference data corresponding to the next generation. Thereafter, the difference EC session B copies update data on the user disk to a difference EC disk B.

It is assumed that the storage control apparatus 1 has received Write I/O (WT (b)) from the host 2 at time TD. At this time, if the backup to the OPC disk from the user disk has not been completed in the I/O area at this time, the CPU 21 copies data before update (WT (b) old) to the OPC disk. The difference EC session B copies update data (WT (b)) on the user disk to the difference EC disk B.

It is assumed that the storage control apparatus 1 has received an instruction of the generation switch processing from the host 2 at time TE. At this time, the CPU 21 suspends the difference EC session B and starts a difference EC session C for storing difference data corresponding to the next generation. Thereafter, the difference EC session C copies update data on the user disk to a difference EC disk C.

It is assumed that the storage control apparatus 1 has received Write I/O (WT (c)) from the host 2 at time TF. At this time, if the backup to the OPC disk from the user disk has not been completed in the I/O area at this time, the CPU 21 copies data before update (WT (c) old) to the OPC disk. The difference EC session C copies update data (WT (c)) on the user disk to the difference EC disk C.

Thereafter, the generation switch processing is executed at the time point when the backup is required.

According to the abovementioned generation backup processing, only data that has been updated is stored in the respective different EC disks, allowing the disk capacity of the difference EC disks to be reduced as compared to that of the user disk in the case where the update amount is small. Further, the combination of OPC and difference EC functions enables backup of data to be collected for each generation without interfering with accesses from the host 2.

The generation restoration processing according to the first embodiment will next be described.

The generation restoration processing is processing for restoring the user disk, in case of trouble, from backup data of a specified generation selected from among backup data stored in the OPC disk and difference EC disks. The generation restoration processing includes restoration start processing and I/O processing during generation restoration.

Figure 9:
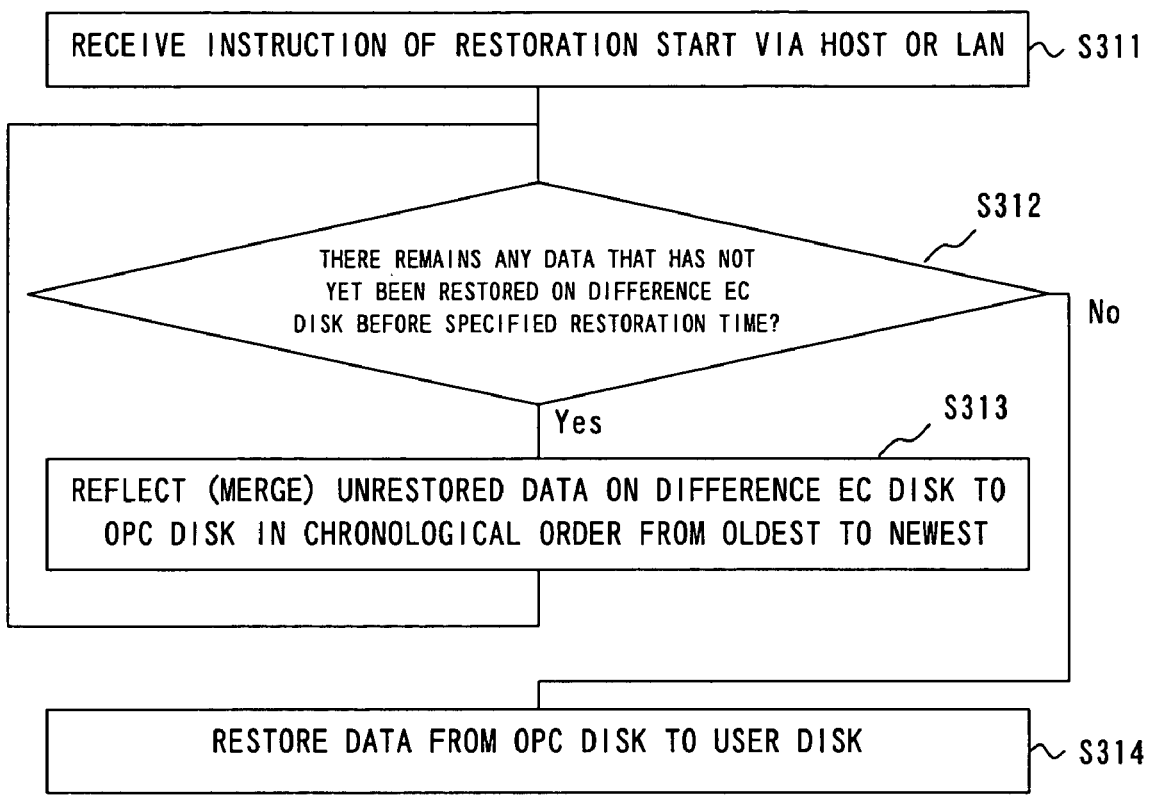
FIG. 9 is a flowchart showing an operation example of restoration start processing according to the first embodiment.

Next, the restoration start processing according to the present embodiment will be described. FIG. 9 is a flowchart showing an operation example of the restoration start processing according to the first embodiment. Upon receiving an instruction of the generation restoration processing including specified restoration time via the host 2 or LAN (S311), the CPU 21 determines whether there remains any data that has not yet been restored on the difference EC disk before specified restoration time (S312). The specified restoration time represents the time to which the user disk is restored. If there remains any data that has not yet been restored (Yes in S312), the CPU 21 reflects (merges) the unrestored data on the difference EC disk to the OPC disk in chronological order from oldest to newest (S313), and the flow returns to step S312. If there is no data that has not been restored (No in S312), the CPU 21 restores data from the OPC disk to user disk (S314), and this flow is ended.

Figure 10:
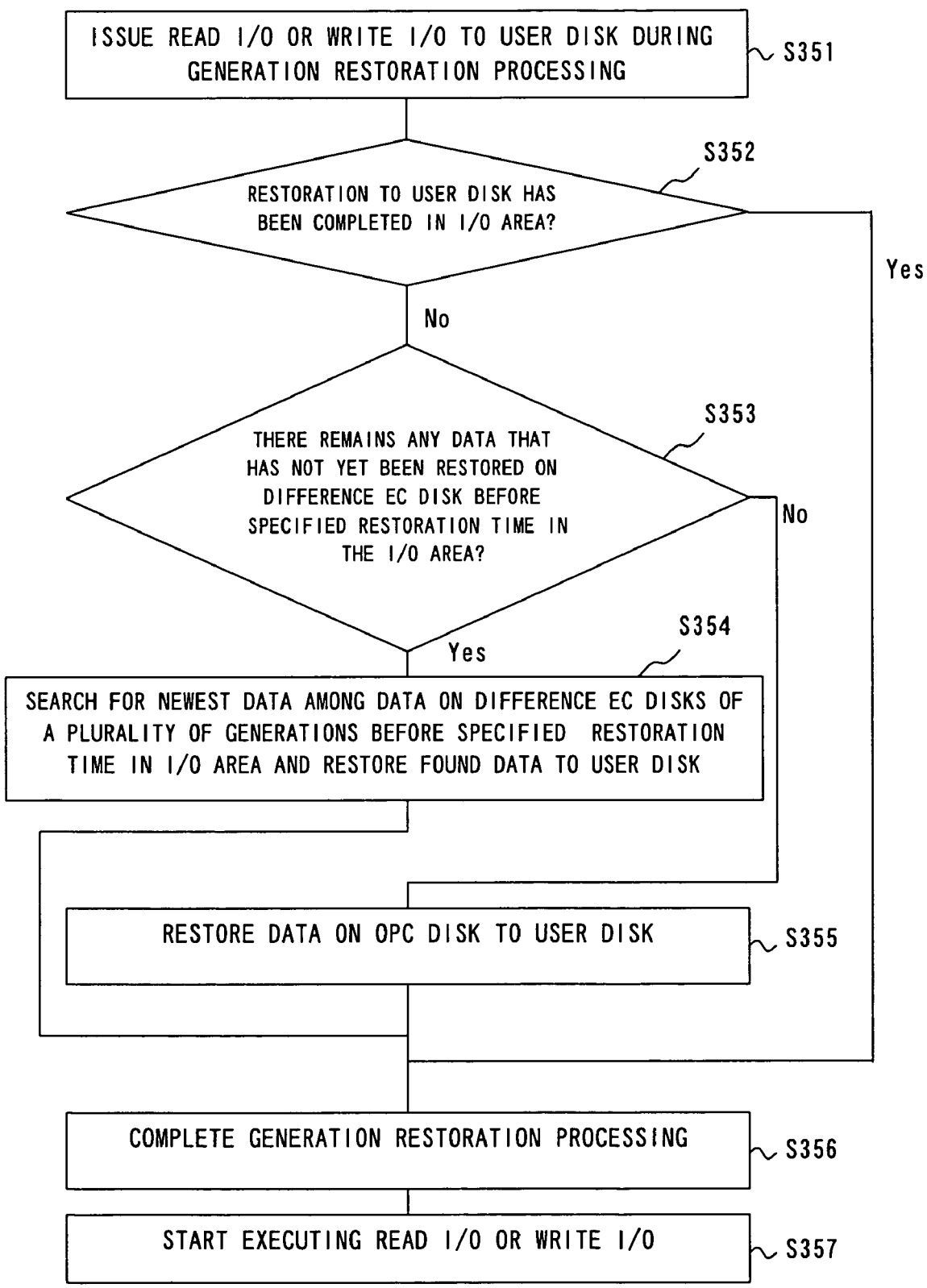
FIG. 10 is a flowchart showing an operation example of I/O processing during generation restoration processing according to the first embodiment.

The I/O processing during generation restoration according to the present embodiment will next be described. FIG. 10 is a flowchart showing an operation example of the I/O processing during generation restoration processing according to the first embodiment. Upon receiving Read I/O or Write I/O for the user disk during generation restoration processing (S351), the CPU 21 determines whether restoration to the user disk has been completed in the I/O area (S352).

If the restoration has been completed (Yes in S352), the flow proceeds to S356. If not completed (No in S352), the CPU 21 determines whether there remains any data that has not yet been restored on the difference EC disk before specified restoration time in the I/O area (S353). If there remains any data that has not yet been restored (Yes in S353), the CPU 21 searches for the newest data among the data on the difference EC disks of a plurality of generations before specified restoration time in the I/O area and restores the found data to the user disk (S354), and the flow proceeds to step S356. If there is no data that has not been restored (No in S353), the CPU 21 restores data on the OPC disk to the user disk (S355), and the flow proceeds to S356. Then, the CPU 21 completes the generation restoration processing (S356) and executes the requested Read I/O or Write I/O (S357), and this flow is ended.

A concrete example of the abovementioned generation restoration processing will next be described.

Figure 11:
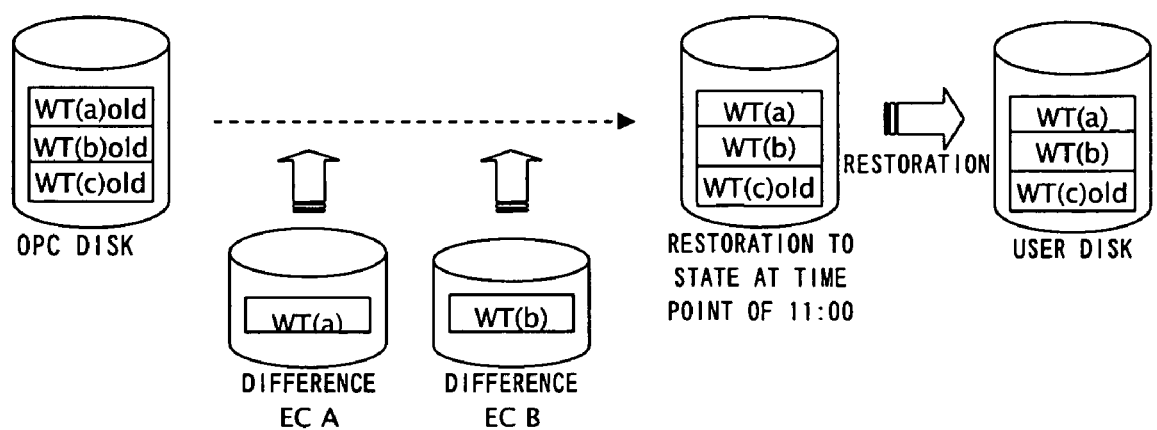
FIG. 11 is a view showing a concrete operation example of generation restoration processing according to the first embodiment.

FIG. 11 is a view showing a concrete operation example of the generation restoration processing according to the first embodiment. It is assumed in this example that OPC session and difference EC session A are started by the generation backup start processing at 9:00, the difference EC session A is switched to the difference EC session B by the generation switch processing at 10:00 (at this time point, data copy to the difference EC disk A is completed), and the difference EC session B is switched to the difference EC session C by the generation switch processing at 11:00 (at this time point, data copy to the difference EC disk B is completed), followed by issuance of a restoration instruction including specified restoration time of 11:00.

The restoration start processing will firstly be described. The CPU 21 checks whether there exists any update data (WT (a)) on the difference EC disk A by referring to the OPC disk (WT (a) old, WT (b) old, and WT (c) old) and difference EC disk A created at 10:00 (S312). If exists, the CPU 21 merges the update data to the OPC disk (S313). Then the CPU 21 checks whether there exists any update data (WT (b)) on the difference EC disk B created at 11:00 (S312). If exists, the CPU 21 merges the update data to the OPC disk (S313). Then the CPU 21 restores data on the OPC disk (WT (a), WT (b), and WT (c) old) to the user disk (S314).

The I/O processing during generation restoration will next be described. The CPU 21 determines whether data in the specified I/O area has completely been restored (S352). If the restoration has been completed, the CPU 21 immediately executes I/O processing (S357). If the restoration has not been completed, the CPU 21 checks there exists any update data on the difference EC disk B corresponding to the specified restoration time of 11:00 (S353). If any update data exists on the difference EC disk B, the CPU 21 restores the update data on the difference EC disk B to the user disk (S354) and executes I/O processing (S357). If not exist, the CPU 21 checks whether there exists any update data on the difference EC disk A which is a disk one generation before the checked difference EC disk B (S353). If any update data exists on the difference EC disk A, the CPU 21 restores the update data on the difference EC disk A to the user disk (S354) and executes I/O processing (S357). If not exist, the CPU 21 restores data on the OPC disk to the user disk (S355) after confirming there is no difference EC disk storing data prior to that on the checked difference EC disk A and executes I/O processing for the user disk (S357).

According to the abovementioned generation restoration processing, in the case where the user disk performs the generation restoration processing in an online state, it performs the I/O processing during generation restoration when receiving an issuance of I/O processing during the generation restoration processing. This allows the generation restoration processing to be executed without interfering with an I/O request from a user. Further, it appears to the user that the generation restoration processing has been completed at the time point when a restoration request has been issued.

Tape backup processing will next be described.

The tape backup processing is processing for copying data on the OPC disk, data on the difference EC disks of a plurality of generations, and LBA conversion table, which are obtained by the abovementioned generation backup processing, to a tape. Since the data on the difference EC disks and LBA conversion table cannot be referred to directly from the host 2, special commands that the host 2 uses are prepared. The special commands include "Read" of data from the difference EC disks, "Write" of data to the difference EC disks, "Read" of the LBA conversion table by the difference EC disks, and "Write" of the LBA conversion table by the difference EC disks.

Figures 12, 13:
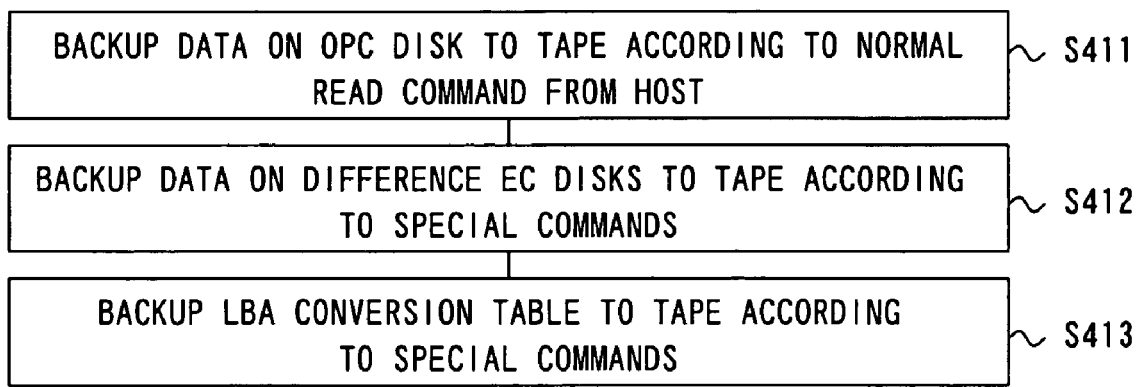
FIG. 12 is a flowchart showing an operation example of tape backup processing according to the first embodiment.
FIG. 13 is a table showing a configuration example of generation management table according to a second embodiment.

FIG. 12 is a flowchart showing an operation example of the tape backup processing according to the first embodiment. The CPU 21 backups data on the OPC disk to the tape according to a normal Read command from the host 2 (S411). Then the CPU 21 backups data on the difference EC disks to the tape according to the special commands from the host 2 (S412). Finally, the CPU 21 backups the LBA conversion table to the tape according to the special commands from the host 2 (S413), and this flow is ended.

According to the abovementioned tape backup processing, the size of backup data on the difference EC disks and processing time needed for the backup can be reduced as compared to the backup of all data including respective generations to the tape, which has taken a considerable amount of time.

Second Embodiment

In this embodiment, a storage control apparatus that uses EC (processing performed by the second copy section) and difference OPC (processing performed by the first copy section) to perform the generation backup processing and generation restoration processing will be described. That is, the storage control apparatus uses EC to perform copy processing during the generation backup processing and uses difference OPC to copy only a difference between a current generation and a previous generation in backup of respective generations.

A configuration of a storage apparatus using the storage control apparatus according to the present embodiment will firstly be described.

The storage apparatus according to the present embodiment has the same configuration as that of the storage apparatus according to the first embodiment. A disk 13 according to the present embodiment includes a user disk serving as a copy source, an EC disk serving as a copy destination of the data that is copied from the entire user disk by EC function and difference OPC disks A, B, and C each serving as a copy destination of a difference copy obtained by OPC function.

Control data according to the present embodiment will next be described.

As is the case with the first embodiment, the control data includes copy session management information, an LBA conversion table, and a generation management table. The configuration of the copy session management information is the same as that in the first embodiment. The LBA conversion table holds information indicating the storage position of data on the difference OPC disk. In the LBA conversion table, logical LBA indicating the LBA of the data on the user disk and physical LBA indicating the actual LBA of the data on the OPC disk are related to each other.

The generation management table will next be described. FIG. 13 is a table showing a configuration example of the generation management table according to the second embodiment. The generation management table has the same configuration as that in the first embodiment except that only the first generation holds an identifier of the EC session and subsequent generations hold identifiers of the difference OPC session.

Generation backup processing according to the present embodiment will next be described.

As is the case with the first embodiment, the generation backup processing includes generation backup start processing, generation switch processing, Write I/O processing during generation backup, difference OPC management processing, and difference OPC deletion processing. Incidentally, the EC session performs copy processing so as to synchronize the EC disk with the user disk during the EC session. The difference OPC session copies difference data on the user disk obtained from the start time to the suspension of the difference OPC session to a corresponding difference OPC disk.

Figure 14:
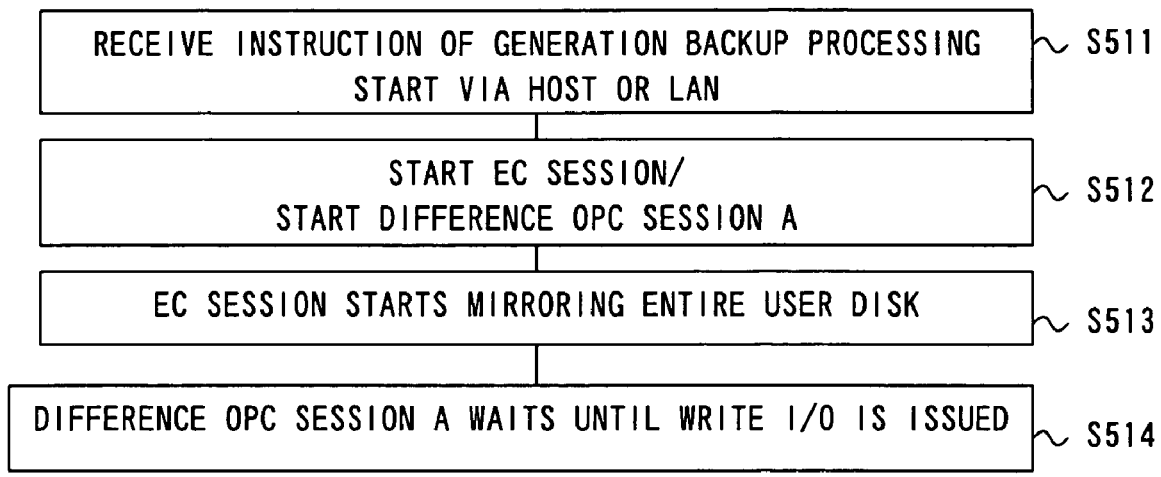
FIG. 14 is a flowchart showing an operation example of generation backup start processing according to the second embodiment.

The generation backup start processing will be described. FIG. 14 is a flowchart showing an operation example of the generation backup start processing according to the second embodiment. Upon receiving an instruction of the generation backup processing via the host 2 or LAN (S511), the CPU 21 makes settings for starting the EC session and difference OPC session A (S512). The EC session activated by the CPU 21 starts mirroring the entire user disk (initial copy processing) (S513). The difference OPC session A activated by the CPU 21 waits until Write I/O is issued (S514) and this flow is ended.

Figure 15:
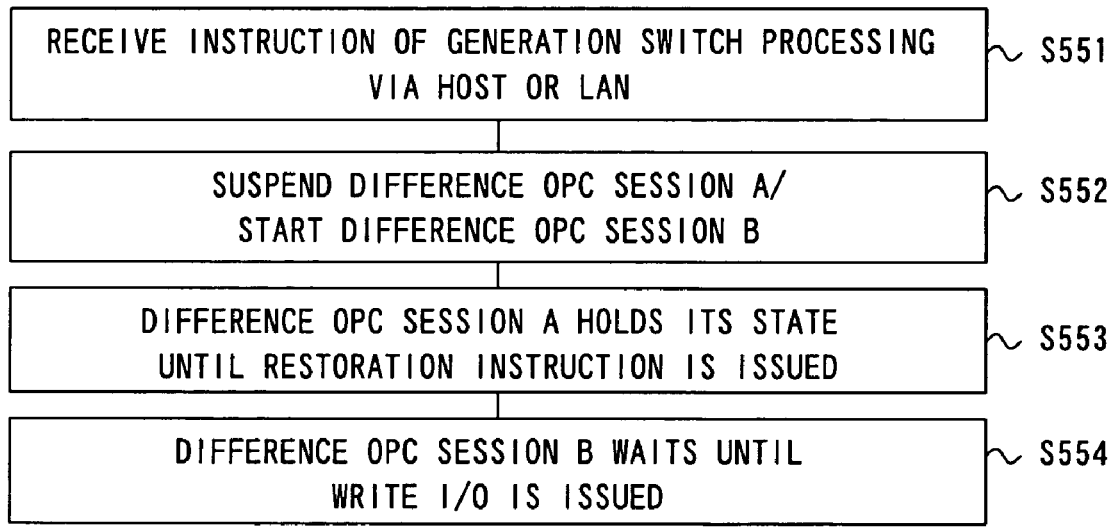
FIG. 15 is a flowchart showing an operation example of generation switch processing according to the second embodiment.

The generation switch processing will next be described. It is assumed in this description that the difference OPC session A which is in operation is switched to the difference OPC session B. FIG. 15 is a flowchart showing an operation example of the generation switch processing according to the second embodiment. Upon receiving an instruction of the generation switch processing via the host 2 or LAN (S551), the CPU 21 makes setting for suspending the difference OPC session A and starting the difference OPC session B (S552). The difference OPC session A activated by the CPU 21 holds its state until a restoration instruction for recovery is issued (S553), while the difference OPC session B activated by the CPU 21 waits until Write I/O is issued (S554) and this flow is ended.

Figure 16:
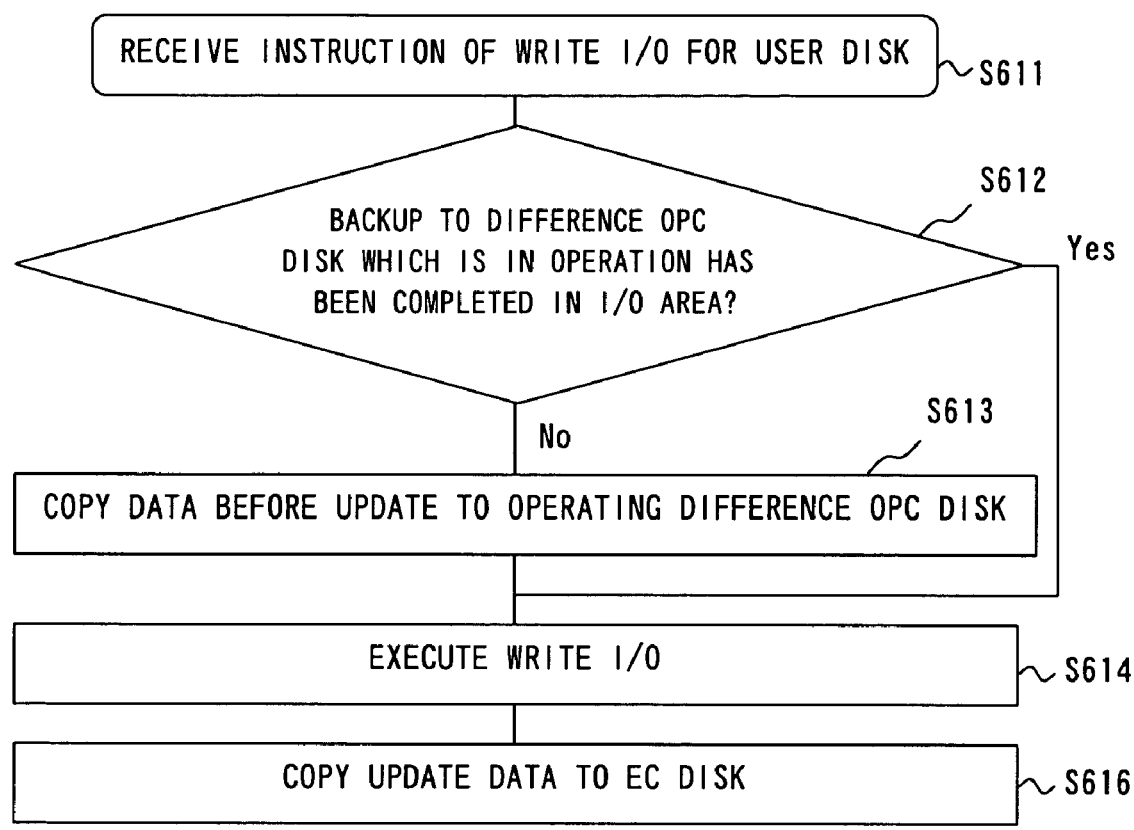
FIG. 16 is a flowchart showing an operation example of Write I/O processing during generation backup according to the second embodiment.

The Write I/O processing during generation backup will next be described. FIG. 16 is a flowchart showing an operation example of the Write I/O processing during generation backup according to the second embodiment. Upon receiving an instruction of Write I/O for the user disk via the host 2 or LAN (S611), the CPU 21 determines whether the backup to the difference OPC disk which is in operation has been completed in the I/O area (S612). When determining that the backup to the difference OPC disk has been completed in the I/O area (Yes in S612), the CPU 21 proceeds to step S614. If not completed (No in S612), the CPU 21 copies data before update to the operating difference OPC disk (S613). The CPU 21 then executes Write I/O (S614). After that, the CPU 21 copies update data to the EC disk (S616), and this flow is ended.

The difference OPC management processing will next be described.

The difference OPC management processing is processing for managing the difference OPC session. The CPU 21 stores, as an LBA conversion table, a correspondence between position information (logical LBA) of the data on the user disk and physical position information (physical LBA) of the data on the difference OPC disk and uses this table for control. In the case where data on the user disk (copy source) is updated during the difference OPC session, the CPU 21 stores the update data to fill up the free space of the difference OPC disk (copy destination) from the front first.

Here, operation performed in the case where Read I/O or Write I/O is issued from the host 2 during the difference OPC session will be described.

When Write I/O is issued to a copy source, the CPU 21 stores data before update in the free space on a physical disk serving as a copy destination.

When Write I/O is issued to a copy destination, the CPU 21 stores data before update in the free space on the copy destination physical disk.

In the case where "data a" is requested at the time when Read I/O is issued to a copy destination, the CPU 21 searches a copy destination physical disk of generation n for "data b" corresponding to "data a". If "data b" exists, the CPU 21 transfers "data b" existing on the physical disk. If "data b" does not exist, the CPU 21 transfers data on the user disk.

The difference OPC deletion processing will next be described.

The CPU 21 deletes a difference OPC disk of the generation no longer required. Further, after deleting a difference OPC disk of some generation, the CPU 21 can use the OPC disk for storing data of the next generation. Therefore, it is possible to perform generation management with less number of disks.

A concrete example of the abovementioned generation backup processing will next be described.

Figure 17:
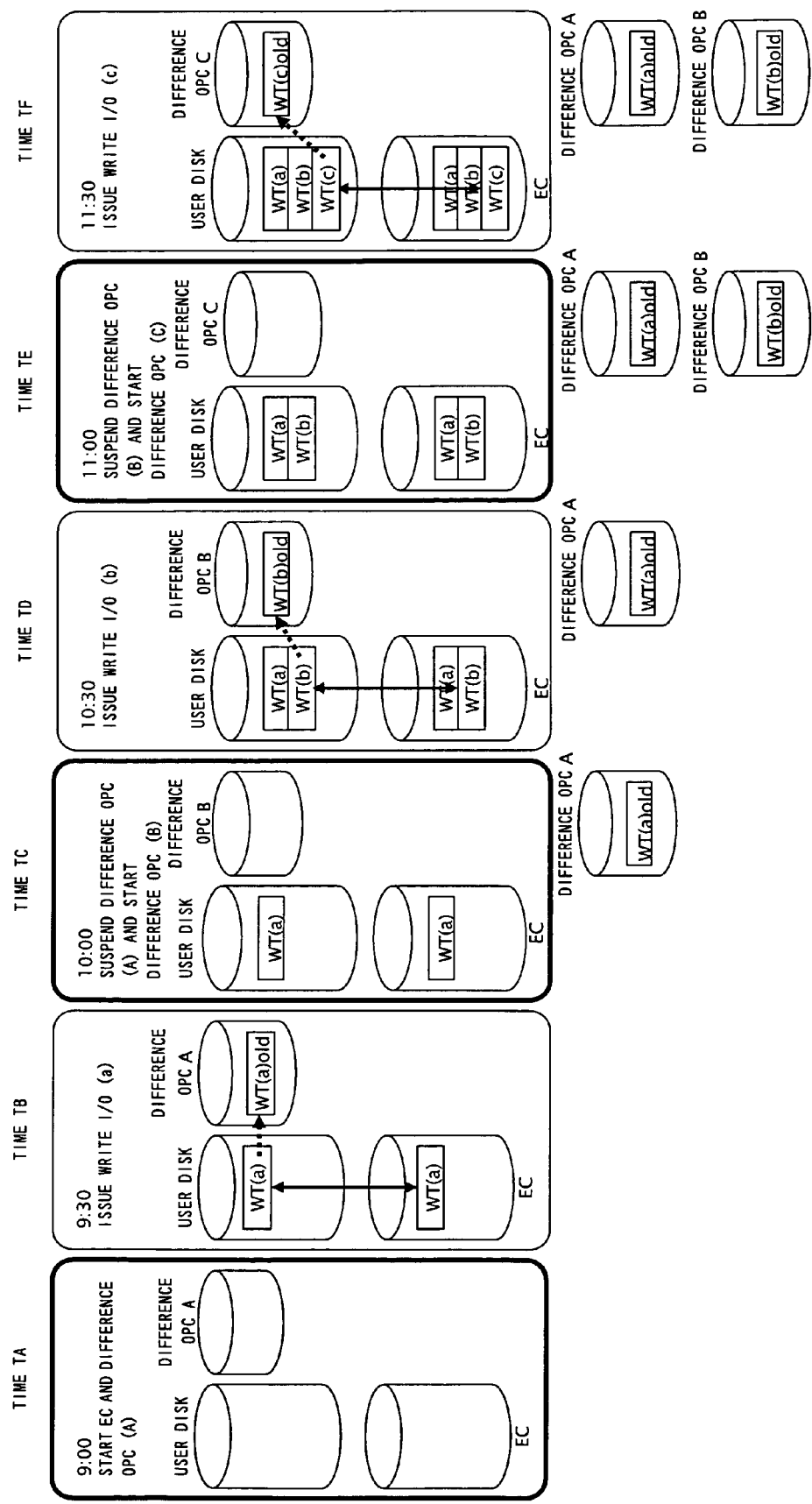
FIG. 17 is a view showing a concrete operation example of generation backup processing according to the second embodiment.

FIG. 17 is a view showing a concrete operation example of the generation backup processing according to the second embodiment. It is assumed that the storage control apparatus 1 has received an instruction of the generation backup processing at time TA from the host 2. At this time, the CPU 21 executes the generation backup start processing to start the EC session and difference OPC session A. The EC session starts mirroring data from the user disk to EC disk (i.e., starts synchronizing the user disk with EC disk). The difference OPC session A waits until Write I/O is issued.

It is assumed that the storage control apparatus 1 has received Write I/O (WT(a)) from the host 2 at time TB. At this time, the EC session performs mirroring (WT (a)) data on the user disk to EC disk. If the copy to the difference OPC disk A from the user disk has not been completed in the I/O area at this time, the difference OPC session A copies data before update (WT (a) old) to the difference OPC disk A.

It is assumed that the storage control apparatus 1 has received an instruction of the generation switch processing from the host 2 at time TC. At this time, the CPU 21 suspends the difference OPC session A and starts a difference OPC session B for storing difference data corresponding to the next generation. Thereafter, the difference OPC session B copies update data on the user disk to a difference OPC disk B.

It is assumed that the storage control apparatus 1 has received Write I/O (WT (b)) from the host 2 at time TD. At this time, the EC session performs mirroring (WT (b)) data on the user disk to EC disk. If the copy to the difference OPC disk B from the user disk has not been completed in the I/O area at this time, the difference OPC session B copies data before update (WT (b) old) to the difference OPC disk B.

It is assumed that the storage control apparatus 1 has received an instruction of the generation switch processing from the host 2 at time TE. At this time, the CPU 21 suspends the difference OPC session B and starts a difference OPC session C for storing difference data corresponding to the next generation. Thereafter, the difference OPC session C copies update data on the user disk to a difference OPC disk C.

It is assumed that the storage control apparatus 1 has received Write I/O (WT (c)) from the host 2 at time TF. At this time, the EC session performs mirroring (WT (c)) data on the user disk to EC disk. If the copy to the difference OPC disk C from the user disk has not been completed in the I/O area at this time, the difference OPC session C copies data before update (WT (c) old) to the difference OPC disk C.

Thereafter, the generation switch processing is executed at the time point when the backup is required.

According to the abovementioned generation backup processing, only data that has been updated is stored in the respective different OPC disks, allowing the disk capacity of the difference OPC disks to be reduced as compared to that of the user disk in the case where the update amount is small. Further, the combination of EC and difference OPC functions enables backup of data to be collected for each generation without interfering with accesses from the host 2.

The generation restoration processing according to the second embodiment will next be described.

The generation restoration processing is processing for restoring the user disk, in case of trouble, from backup data of a specified generation selected from among backup data stored in the EC disk and difference OPC disks. The generation restoration processing includes restoration start processing and I/O processing during generation restoration, as in the case of the first embodiment.

Figure 18:
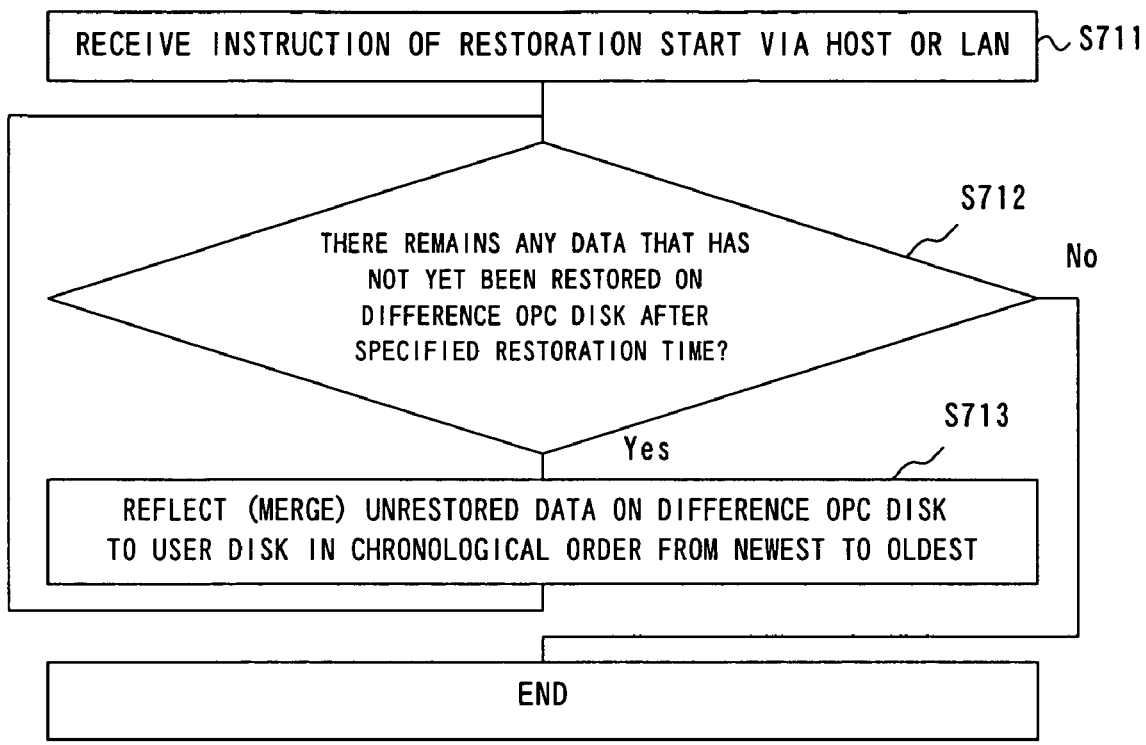
FIG. 18 is a flowchart showing an operation example of the restoration start processing according to the second embodiment.

Next, the restoration start processing according to the present embodiment will be described. FIG. 18 is a flowchart showing an operation example of the restoration start processing according to the second embodiment. Upon receiving an instruction of the generation restoration processing including specified restoration time via the host 2 or LAN (S711), the CPU 21 determines whether there remains any data that has not yet been restored on the difference OPC disk before specified restoration time (S712). The specified restoration time represents the time to which the user disk is restored. If there remains any data that has not yet been restored (Yes in S712), the CPU 21 reflects (merges) the unrestored data on the difference OPC disk to the user disk in chronological order from newest to oldest (S713), and the flow returns to step S712. If there is no data that has not been restored (No in S712), this flow is ended.

Figure 19:
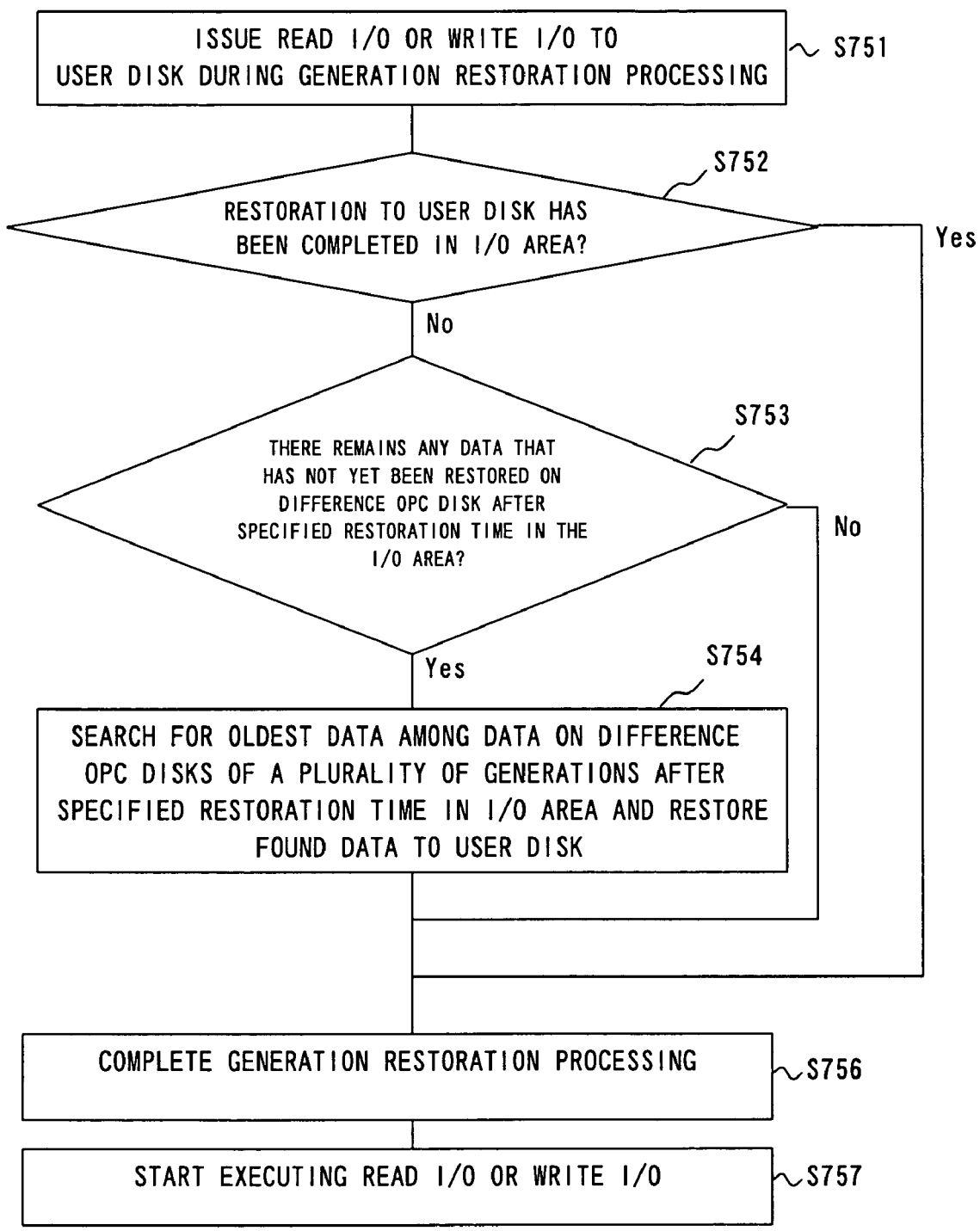
FIG. 19 is a flowchart showing an operation example of the I/O processing during generation restoration processing according to the second embodiment.

The I/O processing during generation restoration according to the present embodiment will next be described. FIG. 19 is a flowchart showing an operation example of the I/O processing during generation restoration processing according to the second embodiment. Upon receiving Read I/O or Write I/O for the user disk during generation restoration processing (S751), the CPU 21 determines whether restoration to the user disk has been completed in the I/O area (S752).

If the restoration has been completed (Yes in S752), the flow proceeds to S756. If not completed (No in S752), the CPU 21 determines whether there remains any data that has not yet been restored on the difference OPC disk before specified restoration time in the I/O area (S753). If there remains any data that has not yet been restored (Yes in S753), the CPU 21 searches for the oldest data among the data on the difference OPC disks of a plurality of generations before specified restoration time in the I/O area and restores the found data to the user disk (S754), and the flow proceeds to step S756. If there is no data that has not been restored (No in S753), the flow proceeds to S756. Then, the CPU 21 completes the generation restoration processing (S756) and executes the requested Read I/O or Write I/O (S757), and this flow is ended.

A concrete example of the abovementioned generation restoration processing will next be described.

Figure 20:
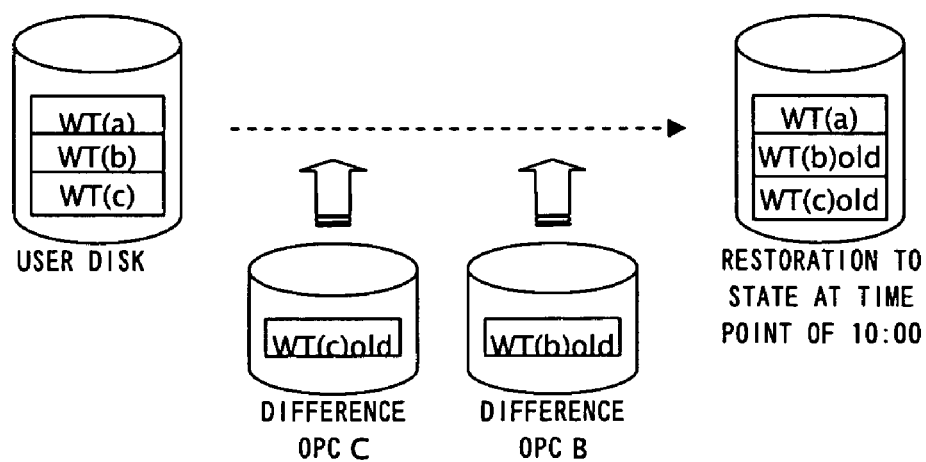
FIG. 20 is a view showing a concrete operation example of the generation restoration processing according to the second embodiment.

FIG. 20 is a view showing a concrete operation example of the generation restoration processing according to the second embodiment. It is assumed in this example that EC session and difference OPC session A are started by the generation backup start processing at 9:00, the difference OPC session A is switched to the difference OPC session B by the generation switch processing at 10:00 (at this time point, data copy to the difference OPC disk B is started), and the difference OPC session B is switched to the difference OPC session C by the generation switch processing at 11:00 (at this time point, data copy to the difference OPC disk C is started), followed by issuance of a restoration instruction including specified restoration time of 11:00.

The restoration start processing will firstly be described. The CPU 21 checks whether there exists any backup data (WT (c) old) on the difference OPC disk C by referring to the user disk (WT (a), WT (b), and WT (c)) and difference OPC disk C for which the copy operation is started at specified restoration time of 11:00 (S712). If exists, the CPU 21 merges the existing backup data to the user disk (S713). Then the CPU 21 checks whether there exists any backup data (WT (b) old) on the difference OPC disk B for which the copy operation is started at specified restoration time of 10:00 (S712). If exists, the CPU 21 merges the existing backup data to the user disk (S713).

The I/O processing during generation restoration will next be described. The CPU 21 determines whether data in the specified I/O area has completely been restored (S752). If the restoration has been completed, the CPU 21 immediately executes I/O processing (S757). If the restoration has not been completed, the CPU 21 checks there exists any backup data on the difference OPC disk C corresponding to the specified restoration time of 10:00 (S753). If any backup data exists on the difference OPC disk C, the CPU 21 restores the backup data on the difference OPC disk C to the user disk (S754) and executes I/O processing (S757). If not exist, the CPU 21 checks whether there exists any backup data on the difference OPC disk B which is a disk one generation before the checked difference OPC disk C (S753). If any backup data exists on the difference OPC disk B, the CPU 21 restores the backup data on the difference OPC disk B to the user disk (S754) and executes I/O processing (S757). If not exist, the CPU 21 executes I/O processing for the user disk after confirming completion of restoration up to the specified restoration time (S757).

According to the abovementioned generation restoration processing, in the case where the user disk performs the generation restoration processing in an online state, it performs the I/O processing during generation restoration when receiving an issuance of I/O processing during the generation restoration processing. This allows the generation restoration processing to be executed without interfering with an I/O request from a user. Further, it appears to the user that the generation restoration processing has been completed at the time point when a restoration request has been issued.

Tape backup processing will next be described.

As is the case with the first embodiment, the tape backup processing copies data on the EC disk, data on the difference OPC disks of a plurality of generations, and LBA conversion table, which are obtained by the abovementioned generation backup processing, to a tape. The special commands include "Read" of data from the difference OPC disks, "Write" of data to the difference OPC disks, "Read" of the LBA conversion table by the difference OPC disks, and "Write" of the LBA conversion table by the difference OPC disks.

Figure 21:
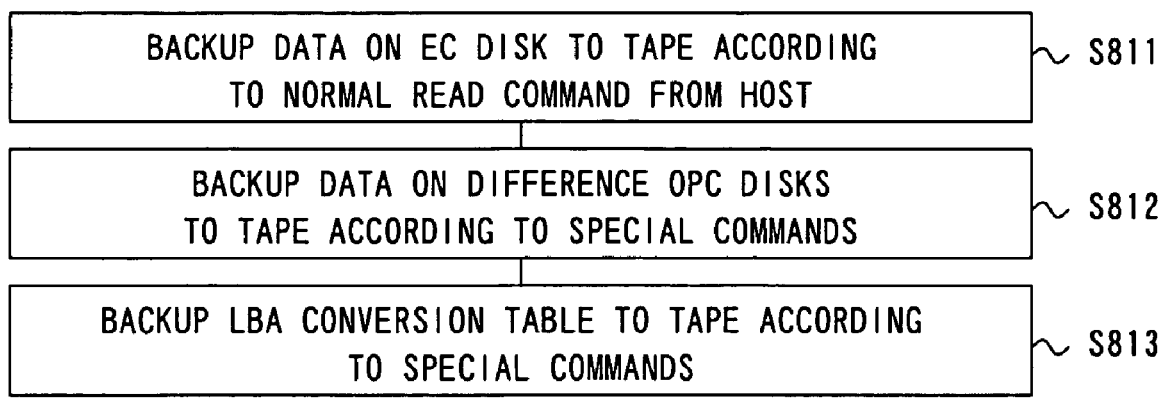
FIG. 21 is a flowchart showing an operation example of the tape backup processing according to the second embodiment.

FIG. 21 is a flowchart showing an operation example of the tape backup processing according to the second embodiment. The CPU 21 backups data on the EC disk to the tape according to a normal Read command from the host 2 (S811). Then the CPU 21 backups data on the difference OPC disks to the tape according to the special commands from the host 2 (S812). Finally, the CPU 21 backups the LBA conversion table to the tape according to the special commands from the host 2 (S813), and this flow is ended.

According to the abovementioned tape backup processing, the size of backup data on the difference OPC disks and processing time needed for the backup can be reduced as compared to the backup of all data including respective generations to the tape, which has taken a considerable amount of time.

Third Embodiment

In the present embodiment, a storage control apparatus that uses the configurations of both the first and second embodiments to perform the generation backup processing and generation restoration processing will be described.

The configuration of a storage apparatus using the storage control apparatus according to the present embodiment and that of the control data are the same as those in the first and second embodiments. The storage control apparatus according to the present embodiment performs the generation backup processing of the first embodiment and that of the second embodiment simultaneously.

The generation restoration processing according to the present embodiment will next be described.

Upon receiving an instruction of the generation restoration processing including specified restoration time, the CPU 21 compares a difference between the specified restoration time and generation backup processing start time and a difference between the current time and specified restoration time. That is, the CPU 21 determines to which one of the generation backup processing start time and current time the specified restoration time is closer. If the specified restoration time is closer to the generation backup processing start time, (if the specified restoration time is older than a predetermined time), the CPU 21 performs the generation restoration processing of the first embodiment; if the specified restoration time is closer to the current time, (if the specified restoration time is newer than a predetermined time), the CPU 21 performs the generation restoration processing of the second embodiment.

A concrete example of the generation restoration processing according to the present embodiment will next be described.

Figure 22:
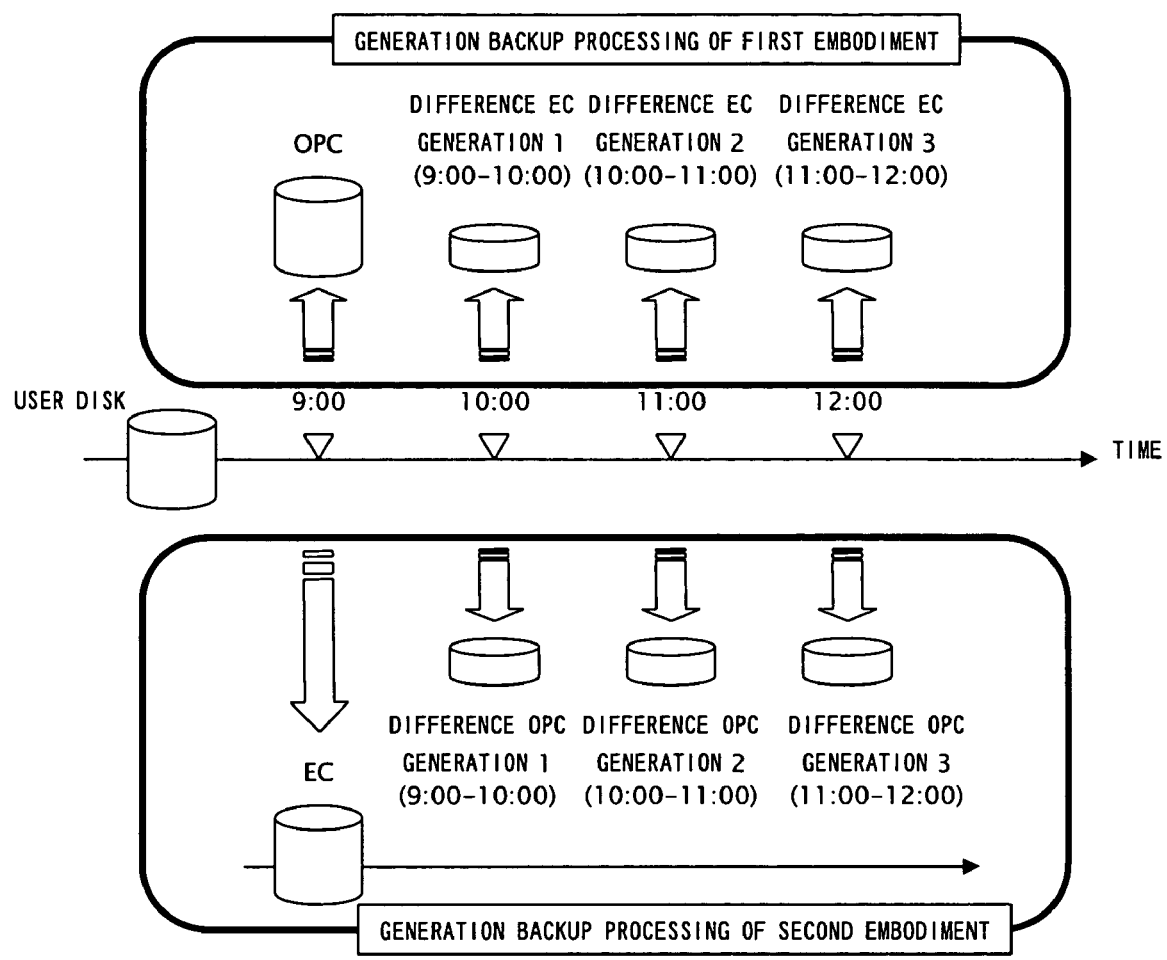
FIG. 22 is a view showing a concrete operation example of the generation restoration processing according to the third embodiment.

FIG. 22 is a view showing a concrete operation example of the generation restoration processing according to the third embodiment. It is assumed in this example that OPC session and difference EC session A are started by the generation backup start processing of the first embodiment as well as EC session and difference OPC session A are started by the generation backup start processing at 9:00, the difference EC session A is switched to the difference EC session B by the generation switch processing of the first embodiment as well as difference OPC session A is switched to the difference OPC session B by the generation switch processing of the second embodiment at 10:00, and the difference EC session B is switched to the difference EC session C by the generation switch processing of the first embodiment as well as difference OPC session B is switched to the difference OPC session C by the generation switch processing of the second embodiment at 11:00.

Assuming that an instruction of the generation restoration processing including specified restoration time of 10:00 is issued at 12:00 (current time), the CPU 21 determines that the specified restoration time is closer to the generation backup processing start time and performs the generation restoration processing of the first embodiment. Assuming that an instruction of the generation restoration processing including specified restoration time of 11:00 is issued at 12:00 (current time), the CPU 21 determines that the specified restoration time is closer to the current time and performs the generation restoration processing of the second embodiment.

According to the abovementioned generation restoration processing, it is possible to select, from two generation restoration processings, one with less processing steps, reducing the generation restoration processing time as a whole.

A first copy step corresponds to at least one of the OPC session and EC session in the embodiments. A second copy step corresponds to at least one of the difference EC session and difference OPC session in the present embodiments. A restoration step corresponds to the generation restoration step in the present embodiments.

The storage control apparatus according to the present embodiment can easily be applied to a storage apparatus to increase the performance thereof. Examples of the storage apparatus include a disk storage apparatus, a disk array apparatus, and the like.

Further, it is possible to provide a program that allows a computer constituting the storage control apparatus to execute the above steps as a storage control program. By storing the above program in a computer-readable storage medium, it is possible to allow the computer constituting the storage control apparatus to execute the program. The computer-readable storage medium mentioned here includes: an internal storage device mounted in a computer, such as ROM or RAM, a portable storage medium such as a CD-ROM, a flexible disk, a DVD disk, a magneto-optical disk, or an IC card.

What is claimed is:

1. A storage control apparatus that creates a generation backup of a predetermined storage, comprising:
   a first copy section that creates a snapshot of all data stored in the predetermined storage at a start time of a snapshot session in a first storage;
   a second copy section that creates a mirror of difference data stored in the predetermined storage in a second storage, the difference data being updated by an update during a difference mirror session;
   a controller that, upon receiving an instruction for starting of the generation backup, starts the snapshot session and the difference mirror session, and upon receiving an instruction for overwriting first data stored in the predetermined storage with second data during the difference mirror session, causes the first copy section to copy the first data stored in the predetermined storage into the snapshot, executes the overwriting after the copying of the first data, and causes the second copy section to copy the second data stored in the predetermined storage into the mirror of the difference data after the overwriting;

a third copy section that creates a mirror of latest data of all data stored in the predetermined storage during a mirror session in a third storage; and a fourth copy section that creates a snapshot of second difference data stored in the predetermined storage at a start time of a difference snapshot session in a fourth storage, the second difference data being updated during the difference snapshot session, wherein when receiving the instruction for the starting of the generation backup, the controller starts the mirror session and the difference snapshot session, and when receiving the instruction for the overwriting during the difference snapshot session, the controller causes the fourth copy section to copy the first data stored in the predetermined storage into the snapshot of the second difference data before the overwriting and causes the third copy section to copy the second data stored in the predetermined storage into the mirror of the latest data after the overwriting.

2. A non-transitory computer readable medium containing therein a storage control program that causes a computer to create a generation backup of a predetermined storage, the program causing the computer to execute:

a first copy process to create a snapshot of all data stored in the predetermined storage at a start time of a snapshot session in a first storage;

a second copy process to create a mirror of difference data stored in the predetermined storage in a second storage, the difference data being updated by an update during a difference mirror session; and a control process, upon receiving an instruction for starting of the generation backup, to start the snapshot session and the difference mirror session, and upon receiving an instruction for overwriting first data stored in the predetermined storage with second data during the difference mirror session, to cause the first copy process to copy the first data stored in the predetermined storage into the snapshot, to execute the overwriting after the copying of the first data, and to cause the second copy process to copy the second data stored in the predetermined storage into the mirror of the difference data after the overwriting;

a third copy process to create a mirror of latest data of all data stored in the predetermined storage during a mirror session in a third storage; and a fourth copy process to create a snapshot of second difference data stored in the predetermined storage at a start time of a difference snapshot session in a fourth storage, the second difference data being updated during the difference snapshot session, wherein when receiving the instruction for the starting of the generation backup, the control process starts the mirror session and the difference snapshot session, and when receiving the instruction for the overwriting during the difference mirror session, the control process causes the fourth copy process to copy the first data stored in the predetermined storage into the snapshot of the second difference data before the overwriting and causes the third copy process to copy the second data stored in the predetermined storage into the mirror of the latest data after the overwriting.

3. A storage control apparatus that creates a generation backup of a predetermined storage, comprising:

a first copy section that creates a snapshot of all data stored in the predetermined storage at a start time of a snapshot session in a first storage;

a second copy section that creates a mirror of difference data stored in the predetermined storage in a second storage, the difference data being updated by an update during a difference mirror session;

a controller that, upon receiving an instruction for starting of the generation backup, starts the snapshot session and the difference mirror session, and upon receiving an instruction for overwriting first data stored in the predetermined storage with second data during the difference mirror session, causes the first copy section to copy the first data stored in the predetermined storage into the snapshot, executes the overwriting after the copying of the first data, and causes the second copy section to copy the second data stored in the predetermined storage into the mirror of the difference data after the overwriting, wherein when receiving an instruction for switching generation of the generation backup, the controller switches the difference mirror session to an additional difference mirror session so that the second copy section creates an additional mirror of additional difference data in the second storage and the additional data is updated by an update during the additional difference mirror session.

4. The storage control apparatus according to claim 3, wherein upon receiving an instruction of restoration including a restoration target time, the controller reflects the mirrors of the difference data prior to the restoration target time on the snapshot in chronological order from oldest to newest and restores the snapshot obtained by the reflecting to the predetermined storage.

5. A non-transitory computer readable medium containing therein a storage control program that causes a computer to create a generation backup of a predetermined storage, the program causing the computer to execute:

a first copy process to create a snapshot of all data stored in the predetermined storage at a start time of a snapshot session in a first storage;

a second copy process to create a mirror of difference data stored in the predetermined storage in a second storage, the difference data being updated by an update during a difference mirror session; and a control process, upon receiving an instruction for starting of the generation backup, to start the snapshot session and the difference mirror session, and upon receiving an instruction for overwriting first data stored in the predetermined storage with second data during the difference mirror session, to cause the first copy process to copy the first data stored in the predetermined storage into the snapshot, to execute the overwriting after the copying of the first data, and to cause the second copy process to copy the second data stored in the predetermined storage into the mirror of the difference data after the overwriting, wherein when receiving an instruction for switching generation of the generation backup, the control process switches the difference mirror session to an additional difference mirror session so that the second copy section creates an additional mirror of additional difference data in the second storage and the additional data is updated by an update during the additional difference mirror session.

6. The computer readable medium according to claim 5, wherein upon receiving an instruction of restoration including a restoration target time, the program allows the computer to execute a restoration process that reflects the mirrors of the difference data prior to the restoration target time on the snapshot in chronological order from oldest to newest and restores the snapshot obtained by the reflecting to the predetermined storage.

* * * * *